United States Patent [19]
Wilmot et al.

[11] 4,020,629
[45] May 3, 1977

[54] SOLID SIDE BAR RIVETLESS CHAIN

[75] Inventors: George L. Wilmot, Stroudsburg; James A. Redding, Pittsburgh, both of Pa.

[73] Assignee: Wilmot Engineering Company, White Haven, Pa.

[22] Filed: Feb. 5, 1976

[21] Appl. No.: 655,578

[52] U.S. Cl. ............... 59/85
[51] Int. Cl.² ............... F16G 13/08
[58] Field of Search ............... 59/85–89; 198/189

[56] References Cited
UNITED STATES PATENTS 2,860,520 11/1958 Sull ............... 198/189 X
3,457,721 7/1969 Trudeau ............... 59/85

FOREIGN PATENTS OR APPLICATIONS 1,059,572 11/1953 France ............... 59/85

Primary Examiner—Milton S. Mehr
Attorney, Agent, or Firm—Clarence A. O'Brien; Harvey B. Jacobson

[57] ABSTRACT

A rivetless chain having solid side bars and a slotted center link interconnected by a removable pin having end lugs associated with locking recesses in the side bars. The side bars are forged and the solid construction thereof prevents accumulation of particles of material therein. The rivetless chain is useful in various orientations such as in overhead conveyors, trolley conveyors and in many other installations where a chain having large dimensions, such as a pitch of several inches, is employed.

5 Claims, 5 Drawing Figures

SOLID SIDE BAR RIVETLESS CHAIN

BACKGROUND OF THE INVENTION

1. Field of the Invention

The present invention generally relates to a chain construction and more particularly to such a chain adapted to be entrained over end sprockets and the like with the chain having center links interconnected by side bars with the side bars and center links being connected by a removable pin rather than a rivet or other permanent fastening device thereby enabling assembly and disassembly of the components in a rapid manner without requiring the use of tools or metal working apparatus.

2. Description of the Prior Art

Rivetless chains have been used for many years in various types of conveyors, material handling equipment and the like in which the endless chain is entrained over end sprockets and the like. Such chains are constructed with center links having remote ends received between the ends of side bars with the center links and side bars being interconnected by a removable pin. Heretofore, the side bars have been constructed with open spaces which frequently results in particles becoming lodged in and retrained in such open spaces. This is a particular problem when conveying materials having adhesive qualities or properties which will cause the material to adhere to, harden on or otherwise fill the open spaces in the side bars. Previous rivetless chain connecting pins included a T-head on each end thereof which is received in notches in the outer surfaces of the side bars with the T-heads being movable through the open spaces in the side bars when turned 90° and moved inwardly from its normal position at the end of a slot-like open space in the side bars. The two side bars are movable toward each other when the center link is oriented generally in perpendicular relation to the side bars and moved longitudinally so that a reduced width area of the center link is brought into registry with the side bars which enables the side bars to be moved towards each other and the retaining pin rotated 90 degrees after which the side bars may be moved longitudinally and disconnected from the pin. Wilmot Engineering Co. of White Haven, Pennsylvania, manufactures this type of rivetless chain having various pitch sizes depending upon installational requirements.

SUMMARY OF THE INVENTION

An object of the present invention is to provide a rivetless chain constructed from alternate center links and pairs of side bars connected together to form an endless conveyor chain or the like in which the side bars are of solid construction and provided with thickened bosses at each end thereof.

Another object of the invention is to provide a rivetless chain in accordance with the preceding object in which a connecting pin is provided for connecting the center links and side bars with the pin including laterally extending lugs thereon for positioning in outwardly facing notches in the bosses and the pin has a single lug on one end thereof for passage through a radial groove in the ends of the side bars to enable assembly of and disassembly of the side bars and center links.

A further object of the invention is to provide a rivetless chain in which the side bars are solid and have end openings forming substantially continuous bearing engagement with the pins thereby prolonging the useful life of the chain.

Still another important object of the present invention is to provide a rivetless chain having solid side bars and a unique connecting pin in which the chain components are forged for increasing the strength characteristics and life expectancy of the chain.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
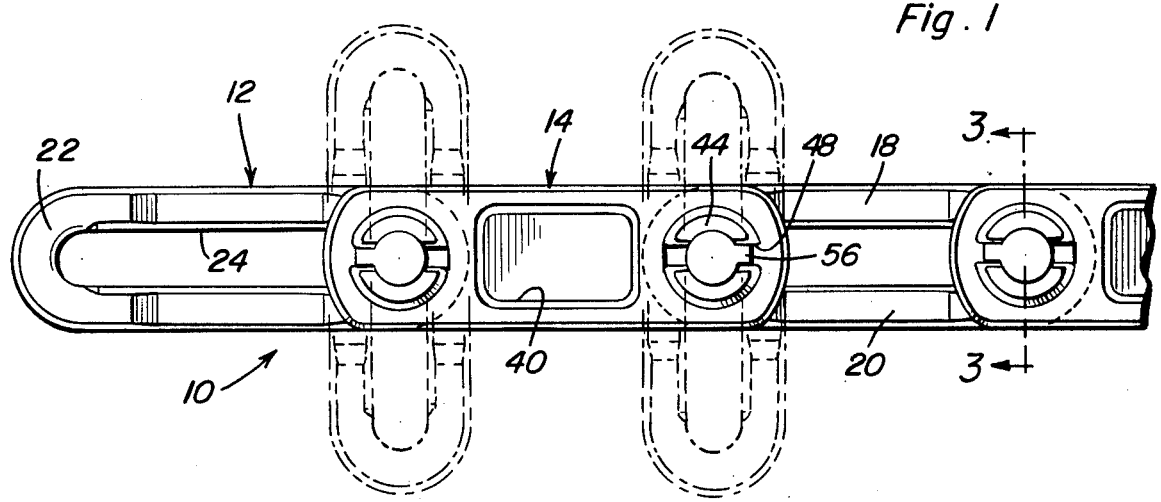
FIG. 1 is a side elevational view of a portion of the rivetless chain of the present invention illustrating the positioning of the center links in broken line necessary to disassemble and assemble the components.

Referring now specifically to the drawings, the numeral 10 designates the rivetless chain of the present invention which is constructed from a plurality of center links generally designated by the numeral 12, a plurality of pairs of side bars generally designated by numeral 14 in which the center links 12 and side bars 14 are interconnected by removable connecting pins generally designed by numeral 16.

Figure 2:
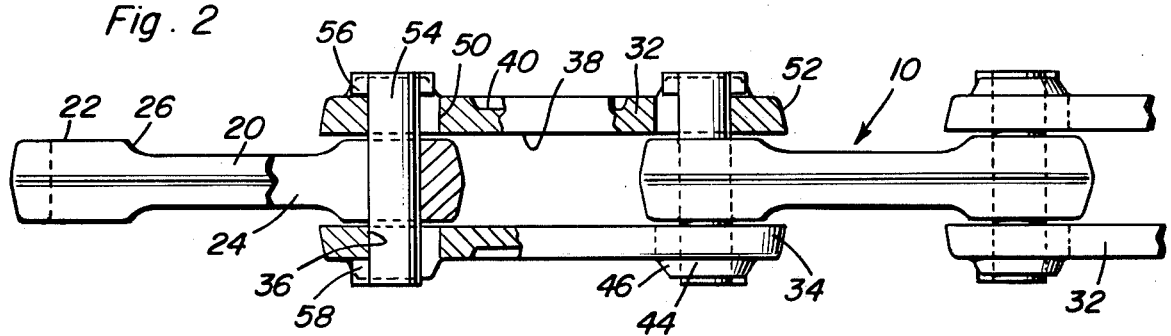
FIG. 2 is a plan view of the construction of FIG. 1 with portions of the side bars and center link broken away illustrating the structural details thereof.
Figure 3:
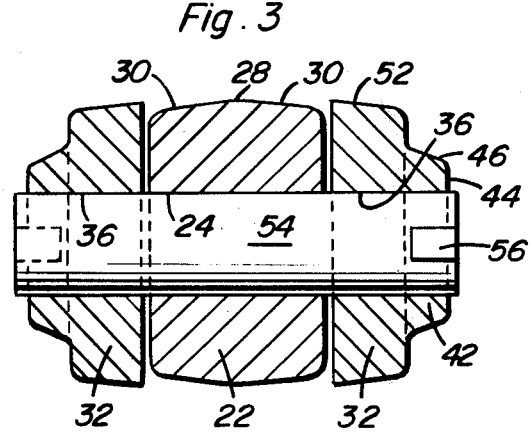
FIG. 3 is a transverse, sectional view taken substantially upon a plane passing along section line 3—3 of FIG. 1 illustrating further structural details of the association between the side bars, center link and pin.

Each center link 12 includes spaced parallel central portions 18 and 20 and U-shaped portions 22 at each end thereof which interconnect the center portions 18 and 20 and cooperate therewith to form an elongated internal slot 24. As illustrated in FIG. 2, the U-shaped end portions 22 are substantially thicker or wider than the central portions 18 and 20 with the juncture between the end portions 22 and the central portions 18 and 20 being inclined and designated by numeral 26. The outer edges of the link are radiused and the parallel portions of the slot 24 are also radiused and the external surface of the center link is constructed with a high central ridge 28 and outwardly and inwardly inclined surfaces 30 as indicated in FIG. 3.

Each side bar 14 includes a solid bar 32 having rounded ends 34 and an opening 36 adjacent each end thereof. The inner surface of the bar 32 is flat as designed by numeral 38 and the outer surface thereof is flat except for a recess 40 in the central portion thereof in which identifying indicia may be provided or in some instances, the recess 40 may be omitted. Each opening or passageway 36 is provided with a laterally extending boss 42 on the outer surface of the bar 32. The boss 42 is provided with a flat outer edge surface and an inclined or beveled peripheral edge 46. The boss 42 is provided with a pair of diametrically opposed notches 48 therein which are oriented along the longitudinal center line of the bar 32. Also, each of the openings 36 is provided with a radial groove 50 in alignment with the notch 48 disposed longitudinally inwardly of the bar 32 with the depth of the groove 50 being such that the inner wall of the groove 50 coincides with the outer extremity of the aligned notch 48. The external peripheral surface of the bar 32 is inclined or beveled slightly from the outer surface toward the inner surface as designated by numeral 52 in FIGS. 2 and 3 so that the inner edge of the periphery of the bar 32 is slightly larger than the outer edge of the periphery of the bar 32.

Figure 5:
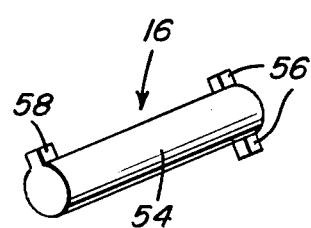
FIG. 5 is a perspective view of the connecting pin employed in the rivetless chain.

The pin 16 is in the form of a cylindrical member or pin 54 having a pair of diametrically opposed, radially extending lugs 56 at one end thereof and a single radially extending lug 58 at the other end thereof with the lug 58 being in longitudinal alignment with one of the lugs 56 as illustrated in FIG. 5. The lugs 56 and 58 are of a size to be received in the notches 48 and the lug 58 is of a size to pass through the groove 50 in the opening 36. The distance between the axially inner edges of the lug 58 and the lug 56 aligned therewith is substantially the same as the distance between the outer surfaces of the side bars 14 when the end portion 22 of the center link 12 is disposed between the side bars 14 as illustrated in FIGS. 2 and 3. In this arrangement, with the lug 58 misaligned with the groove 50, as illustrated in FIG. 2, the side bars and center link are retained in assembled relation with the pin 54 defining a supporting pin and providing bearing for the center link so that the center link can pivot around the pin 54 with the center of the pin defining the pivot axis for the center link.

Figure 4:
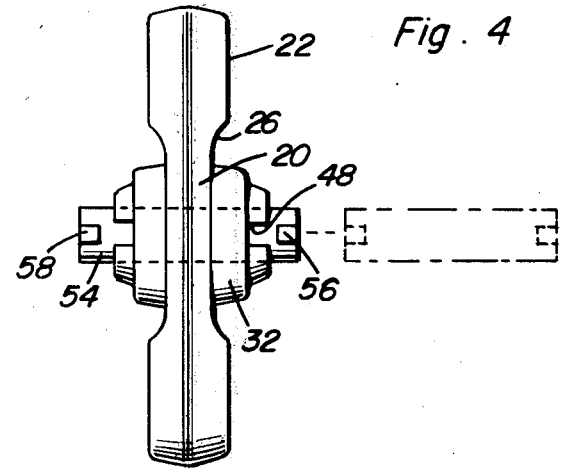
FIG. 4 is an end view illustrating the association of a center link with a pair of side bars when the side bars are registered with the reduced thickness area of the center link to enable the connecting pin to be rotated and removed.

In order to disassemble the center link and side bars, the center link 12 must be pivoted to a position perpendicular to the side bars 14 as illustrated in broken line in FIG. 1 and in FIG. 4. The center link 12 is oriented with the reduced thickness portions 18 and 20 aligned with and receiving the end portions of the side bars 14 as illustrated in FIG. 4. With two adjacent center links so oriented as illustrated in FIG. 1, the two side bars 14 may be moved towards each other a distance sufficient that the lugs 56 and 58 will be slightly outwardly of the flat outer ends 44 of the bosses 42 as illustrated in FIG. 4 so that the pin 54 may then be rotated one half turn to bring the lug 58 into registry with the notch 48 and groove 50 oriented longitudinally inwardly of the side bars. The pin 54 then may be moved longitudinally with the lug 58 passing through a notch 48, the groove 50 and then through the groove 50 and notch 48 in the opposite side bar. The center link may be pivoted slightly to orient the slot 24 therein in a position so that the lug 58 may pass through the center link. After the lug 58 goes through the center link, it is then moved through the groove 50 and notch 48 in the opposite side bar thus completely disassembling the components. To assemble the components, the reverse procedure is employed.

The solid side bars 14 prevent the accumulation of particulate material in the open spaces usually provided in the side bars and this construction also provides a complete cylindrical bearing surface between the pin 16 and the opening 36 except for the groove 50 which increases the longevity of the pin and the surfaces of the opening 36. The side bars 14 are forged to further increase their strength and wearability characteristics. The assembly procedure and disassembly procedure is quite effective since it requires rotation of the pin 54 180° to selectively register the lug 58 with the grooves 50 and the notch 48 diametrically opposed thereto. When the wider or thicker end portions 22 of the center links 12 are disposed between the flat inner surfaces 38 of the side bars 32, the pin 54 cannot rotate thus maintaining the chain in assembled condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A rivetless chain comprising a plurality of pairs of spaced side bars interconnected by center links and a pivot pin extending through the overlapping ends of a pair of side bars and a center link for pivotally connecting the center link with the side bars, each of said side bars being solid and imperforate from end to end except for a cylindrical opening through each end thereof, said pin being cylindrical and being rotatably and reciprocally but not laterally movably received in said openings, said center link having an elongated slot disposed therein with the end portions of the center link being flat and thicker than the central portion thereof to enable the side bars to move inwardly along the length of the pin when the central portion of the center link is registered with the side bars when the center link is in generally perpendicular relation to the side bars, radially projecting lug means on each end of said pin, the outer surface of each of the side bars including radially extending notch means receiving said lug means when the side bars are in their remote relationship and the end portion of the center link is disposed between the side bars, said lug means being disengageable from the notch means for disassembly of the pin, side bars and center link when the central portion of the center link is disposed between the end portions of the side bars, each of said cylindrical openings in the side bars including a wall engaging substantially the entire periphery of the center pin, and a single groove extending from end to end of the wall forming the opening and enabling passage of the lug means on one end of the pin when the pin has been rotated to register the lug means with the groove.

2. The structure as defined in claim 1 wherein sid lug means on the pin includes a pair of diametric lugs projecting radially from the pin at one end thereof and a single radially projecting lug at the other end thereof with the single lug being in alignment with one of the pair of lugs and having a cross-sectional dimension slightly less than the groove to enable passage therethrough.

3. The structure as defined in claim 2 wherein said notch means includes a boss projecting laterally from the side bar in encircling relation to each opening and defining a portion of the opening, each of said bosses including a pair of diametrically opposed notches therein having a cross-sectional dimension to closely receive said lugs, one of the notches in each pair being aligned with the groove in the opening for passage of the single lug therethrough after movement of 180° from the other notch, the distance between the inner edges of the pair of lugs at one end of the pin and the single lug at the other end of the pin being slightly greater than the distance between the outer surfaces of the bosses when the center link has its central portion registered with the side bars and the side bars are moved inwardly thereby enabling rotation of the pin in the openings to selectively align the single lub thereon with the groove to enable longitudinal movement of the pin in the openings by moving the end of the end of the pin having said pair of lugs thereon in relation to the outer surface of the one of the side bars with the single groove preventing passage of this end of the pin through the openings.

4. The structure as defined in claim 3 wherein said side bars are forged with each opening forming a complete peripheral bearing engaging with the pin except for the space occupied by the groove, said groove in each opening being disposed along the longitudinal centerline of the side bar and oriented toward the center of the side bar.

5. A conveyor chain comprising a plurality of pairs of spaced side bars interconnected by center links, said side bars and links having overlapping end portions and a pivot extending through said overlapping end portions for pivotally connecting the center link with the bars, each of said side bars having a cylindrical opening through each end thereof, said pin being cylindrical and received in said openings, said center link having a longitudinal slot therein receiving said pins, the end portions of the center being thicker than the central portion thereof to enable the side bars to move inwardly along the length of the pin when the central portion of the center link is disposed between the end portions of the side bars, lug means on each end of said pin registered with notch means on the outer surface of each of the side bars when the side bars are spaced apart to receive the end portion of the center link therebetween, said lug means being disengageable from the notch means for disassembly of the pin, side bars and center link when the central portion of the center link is disposed between the end portions of the side bars, said lug means on the pin including a pair of diametric lugs projecting radially from the pin at one end thereof and a single radially projecting lug at the other end thereof with the single lug being in alignment with one of the pair of lugs, said openings in the side bars receiving the center pin including a single groove therein enabling passage of the single lug on one end of the pin when the pin has been rotated to register the single lug with the groove.

* * * * *